United States Patent
Yu et al.

(10) Patent No.: US 11,121,992 B2
(45) Date of Patent: Sep. 14, 2021

(54) INFORMATION PROCESSING METHOD, DEVICE AND ELECTRONIC APPARATUS

(71) Applicant: Lenovo (Beijing) Co., Ltd., Beijing (CN)

(72) Inventors: Chenchen Yu, Beijing (CN); Yingjie Li, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/829,245

(22) Filed: Mar. 25, 2020

(65) Prior Publication Data

US 2020/0314045 A1 Oct. 1, 2020

(30) Foreign Application Priority Data

Mar. 25, 2019 (CN) .......................... 201910226996.0

(51) Int. Cl.
*G06F 15/16* (2006.01)
*H04L 12/58* (2006.01)
*H04L 12/18* (2006.01)

(52) U.S. Cl.
CPC ........ *H04L 51/046* (2013.01); *H04L 12/1822* (2013.01); *H04L 51/16* (2013.01); *H04L 51/26* (2013.01)

(58) Field of Classification Search
CPC ....... H04L 51/16; H04L 51/26; H04L 51/046; H04L 12/1822; H04L 12/58; H04L 12/18
See application file for complete search history.

(56) References Cited

U.S. PATENT DOCUMENTS

| | | | |
|---|---|---|---|
| 10,218,657 B2* | 2/2019 | Cheung | H04L 51/046 |
| 2014/0298210 A1* | 10/2014 | Park | G06F 3/0486 |
| | | | 715/758 |
| 2018/0081529 A1 | 3/2018 | Zhang et al. | |
| 2018/0295083 A1* | 10/2018 | Babu | H04L 51/32 |

FOREIGN PATENT DOCUMENTS

| | | |
|---|---|---|
| CN | 104506410 A | 4/2015 |
| CN | 106034068 A | 10/2016 |
| CN | 107347011 A | 11/2017 |
| CN | 109120495 A | 1/2019 |

* cited by examiner

*Primary Examiner* — Cheikh T Ndiaye
(74) *Attorney, Agent, or Firm* — Anova Law Group, PLLC

(57) ABSTRACT

An information processing method includes detecting a specified input directed to one or more members of a current chat group, determining the one or more members directed to by the specified input as target members, and sending private content to the target members, where the private content is not visible by other members of the current chat group.

15 Claims, 3 Drawing Sheets

INFORMATION PROCESSING METHOD, DEVICE AND ELECTRONIC APPARATUS

CROSS-REFERENCE TO RELATED APPLICATION

This application claims priority to Chinese Patent Application No. 201910226996.0, filed on Mar. 25, 2019, the entire content of which is incorporated herein by reference.

TECHNICAL FIELD

The present disclosure relates to the technical field of information processing and, more particularly, to an information processing method, a device, and an electronic apparatus.

BACKGROUND

With the development of Internet technology and higher user requirements for daily communications, such as the requirements for multi-party communications, various communication applications such as WeChat, QQ, forums, etc., have launched chat group functions to meet users' needs.

However, in a chat group scenario, a user often wants to individually communicate with one or more other users in a chat group session. Often, the user has to temporarily exit the chat group session and chat with others in private separately, or set up another chat group. Such operations are complicated. In addition, individual private chats would make it difficult to conduct an effective communication session among a plurality of people in the chat group session. By setting up another group to address such temporary needs, many chat groups created by the users may become obsolete after being used only once.

SUMMARY

Embodiments of the present disclosure provide an information processing method, which includes detecting a specified input directed to one or more members of a current chat group, determining the one or more members directed to by the specified input as target members, and sending private content to the target members, where the private content is not visible by other members of the current chat group.

Embodiments of the present disclosure provide an electronic apparatus for information processing, which includes a detection circuit, a transmitting circuit, a first controller, a selection circuit, a second controller, and a creation circuit. The detection circuit is configured to detect a specified input directed to one or more members of a current chat group and determine the one or more members directed to by the specified input as target members. The transmitting circuit, configured to send private content to the target members, where the private content is not visible by other members of the current chat group. The first controller configured to cause the target members to enter a private mode, where in the private mode, a content sent to the current chat group is visible by the sender of the private content and the target members. The selection circuit is configured to, when receiving the private content sent by a member of the current chat group, select members from the target members or re-select members from the current chat group to send a response to prompt to the selected members. The second controller is configured to, when receiving the private content sent by the member of the current chat group, enter the private mode. The creation circuit is configured to create a temporary conversation including the sender and the target members.

Embodiments of the present disclosure provide a computer readable storage medium storing a computer program that, when the computer program is executed, causes the processor to perform a method of information processing. The method includes detecting a specified input directed to one or more members of a current chat group, determining the one or more members directed to by the specified input as target members, and sending private content to the target members, where the private content is not visible by other members of the current chat group.

DETAILED DESCRIPTION OF THE EMBODIMENTS

Figure 1:
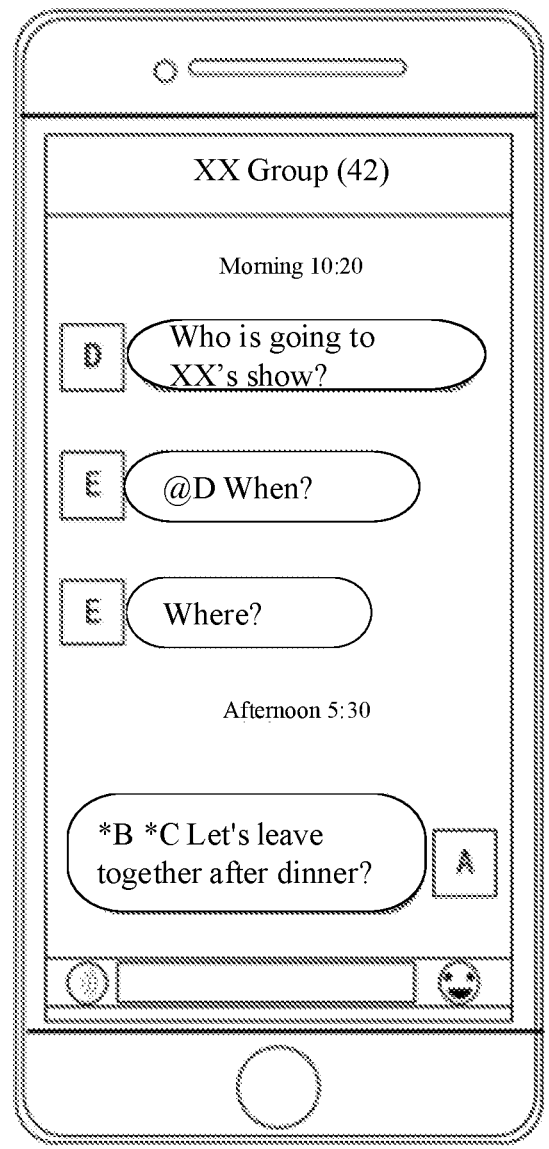
FIG. 1 illustrates an application scenario of an information processing method according to the embodiments of the present disclosure.

The embodiments of the present disclosure are described as follows with reference to the accompanying drawings. The description is exemplary and does not limit the scope of the present disclosure. With the following detail description, to facilitate explanation, a plurality of specific details are described to provide a comprehensive understanding of the embodiments of the present disclosure. However, one or more embodiments may be implemented without these specific details. In addition, in the following description, descriptions of well-known structures and technologies are omitted to avoid unnecessarily obscuring the concepts of the present disclosure.

In the present disclosure, the terms are merely used for describing the specific embodiments but does not intend to limit the present disclosure. The terms of "include," "contain," etc., indicate a presence of features, processes, operations and/or components but do not exclude a presence or addition of one or more other features, steps, operations or components.

The terms (include technical terms and scientific terms) used herein contain meanings generally understood by those of skill in the art, unless otherwise specified. The terms used herein should be interpreted to have meanings consistent with the context of the present specification and should not be interpreted in an idealized or overly rigid manner.

When an expression such as "at least one of A, B, or C" is used, they should generally be interpreted in accordance with the meaning commonly understood by those skilled in the art. For example, "a system having at least one of A, B, or C" should include but not limited to a system having A alone, B alone, C alone, A and B, A and C, B and C, and/or A, B, and C.

With reference to the accompanying drawings, some block diagrams and/or flowcharts are shown, where some blocks or combinations of the blocks may be implemented by computer program instructions. The computer program instructions can be provided to a general purpose computer, a specific purpose computer, or a processor of another programmable data processing device, such that the instructions can be executed by the processor to create a device to implement functions/operations described in the block diagrams and/or flowcharts. The technology of the present disclosure can be implemented in forms of hardware and/or software (including firmware, microcode, etc.). The technology of the present disclosure may be in form of a computer program product storing the computer instructions at a computer readable storage medium. The computer program product can be used by an instruction execution system or used in conjunction with the instruction execution system.

Embodiments of the present disclosure provide an information processing method including responding to a detection of a specified input directed to one or more members of a current chat group to determine the one or more members directed to by the specified input as target members and responding to a reception of a sent instruction to send a to-be-sent private content to the target members, where the private content is not visible by other members of the current chat group.

FIG. 1 illustrates an application scenario of the information processing method according to the embodiments of the present disclosure. FIG. 1 shows merely an example applied to the scenario of the embodiments of the present disclosure to help those of skill in the art to understand technical contents of the present disclosure, but does not mean that the embodiments of the present disclosure cannot be used for other devices, systems, environments, or scenarios.

Users can perform chat group using terminal devices, that is, a plurality of users can converse in a same group. Speech of each user in the group can be visible by other members of the group.

For example, as shown in FIG. 1, a group of user A has 42 members. User A want to leave with user B and user C together after a dinner gathering but does not want the other members of the group to know. Often, A usually has to converse with B and C individually in this situation, the efficiency is low, and users B and C also need to communicate separately with A. As an alternative, user A may create another group including B and C, but an operation for creating the group is relative complicated, and the newly created group probably will not be used again due to its temporary purpose, which causes unnecessary waste. In accordance with the embodiments of the present disclosure, user A can input a specified input directed to B and C, for example, "*B *C," when sending content, such as a sentence of "*B *C Let's leave together after dinner?," a system can send this content to B and C without shown to the other members of the chat group. Only "*" is taken as an example of an identifier of the specified input herein and in the following specification. Those skilled in the art may define any other characters or combinations of characters as a specified input, which is not limited in the embodiments of the present disclosure.

The terminal devices may be, e.g., various electronic devices having displays including but not limited to a smart phone, a tablet, a laptop, a desktop, etc.

Figure 2:
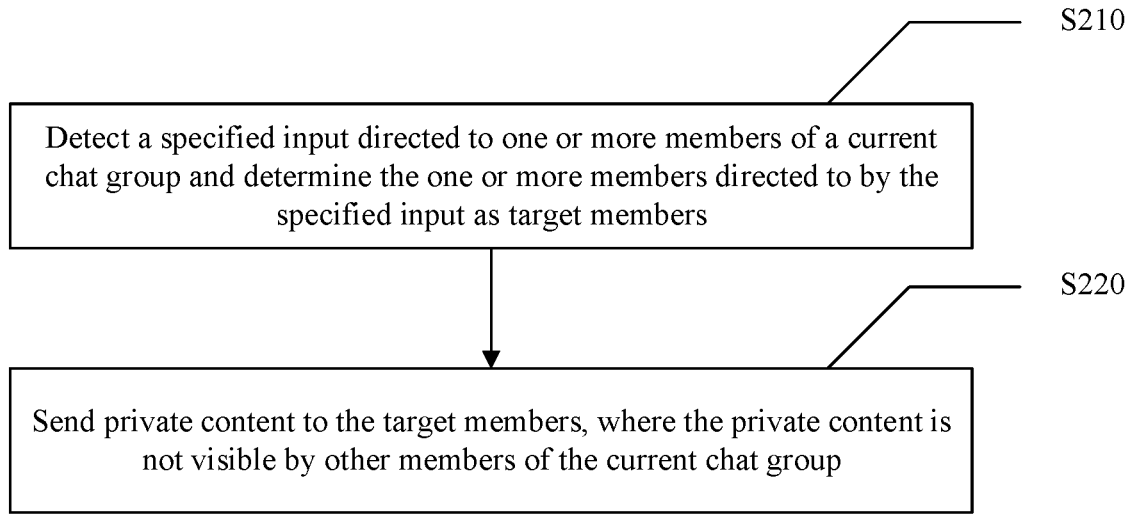
FIG. 2 illustrates a flow chart of an information processing method according to the embodiments of the present disclosure.

FIG. 2 illustrates a flowchart of the information processing method according to the embodiments of the present disclosure.

As shown in FIG. 2, the method includes S210 and S220.

At S210, an application detects a specified input directed to one or more members of a current chat group and determines the one or more members directed to by the specified input as target members.

In accordance with the embodiments of the present disclosure, the specified input includes a combination of a first identifier and a target member identifier or a combination of a second identifier and a member identifier excluding the target members. For example, "*" can be set as the first identifier, the member identifier can use a member name, and "'*'+member name" is used as the specified input. For example, "*A" represents the specified input to point A as the target member. For another example, "#" can be set as the second identifier, the member identifier can use a member name, and "'#'+member name" is used as the specified input. For example, "#A" represents that the specified input points to the members excluding A as the target members of the chat group.

In the embodiments of the present disclosure, detection time is not defined. For example, with a real time detection of user inputs, when "'*'+member name" is used as the specified input, and user A enters e.g., "*B", B is determined as a target member. For example, when user A continues to enter "*C" to obtain "*B*C", B and C can be further determined as the target members. If a content after "*" is not the member names of the chat group, "*" can be determined not to use a private chat function but determined to normally use the chat group. In another example, when a sent instruction from the user is obtained, a to-be-sent content is detected whether the specified input directed to the one or more members of the current chat group is contained. For example, "*B*C", after obtaining the sent instruction and before sending the to-be-sent content, B and C are determined as the target members. Therefore, operation S210 can be executed before operation S220 and also be executed during operation S220.

In the embodiments of the present disclosure, during an input process, when a specified identifier (e.g., "*") indicating private content entered by a user is detected, an interface for a member selection pops up, which can avoid an operation load of entering member names for the user.

At S220, the application sends a to-be-sent private content to the target members, where the private content is not visible by other members of the current chat group.

In accordance with the embodiments of the present disclosure, a display effect of private content is different from the display effect of other contents of the chat group. For example, the private content is displayed in forms of using specific fonts, sizes, text colors, background colors, etc., to facilitate users to distinguish the private content from the normal contents.

In accordance with the embodiments of the present disclosure, the private content can be sent to the terminal devices of all the members, but the electronic devices of the other members except the sender and the target members do not display the private content, such that the private content cannot be visible by the other members of the current chat group. In another way, the sentence can only be sent to the target members but not be sent to the other members of the current chat group.

In accordance with the embodiments of the present disclosure, responding to a reception of a sent instruction to send a to-be-sent private content to the target members, where the private content cannot be visible by the other members of the current chat group, includes responding to the reception of the sent instruction to send the to-be-sent private content and cause the private content to be displayed at an interface of the current chat group, where the private content can be visible by the target members and cannot be visible by the other members of the current chat group.

For example, user A sends "*B *C Let's leave together after dinner?" to the current chat group. As shown in FIG. 1, at the terminal device of user A, the sentence is displayed directly at the interface of the current chat group. At the interfaces of user B and user C, the sentence is also visible in the chat group. For the other members of the group, for example user D and user E, the sentence is not displayed in the chat group at the terminal devices of user D and user E.

In some embodiments of the present disclosure, after one or more of members directed to by a specified input are determined as target members, the method further includes causing a private content sender and the target members to enter a private mode. In the private mode, a content sent to the current chat group can only be visible by the private content sender and the target members until the private content sender and the target members exit the private mode.

For example, after user A sends the private content to user B and user C, user A enters the private mode, or user A, B, and C enter the private mode at a same time. In the private mode, the users do not need to enter the specified input anymore and continue to chat directly in the current chat group, where the chat contents can only be visible by user A, B, and C. Any one of user A, B, and C can actively exit the private mode to participate in the previous chat group and communicate with the other members of the chat group.

In accordance with the embodiments of the present disclosure, another identifier can be set as an instruction for exiting a private mode. "*" is merely taken as an example below but does not limit the present disclosure. For example, when user A enters and sends "*", user A exits the private mode. A content sent by user A without the specified input thereafter is visible by all the members of the chat group.

For another example, when user A enters "Hello Everyone", user A can exit the private mode and send a message of "Hello Everyone" directly to the chat group. "" cannot be visible by the other members, and "Hello Everyone" can be visible by all the members.

In accordance with the embodiments of the present disclosure, the method further includes, when receiving private content sent by a member of the current chat group, responding to a detection of an operation to the private content to control to enter a private mode. In the private mode, a content sent to the current chat group can only be visible by members, who can see the private content, until the members exit the private mode.

In the embodiments of the present disclosure, sending the private content to the target members may not cause the target members to enter the private mode immediately. For example, when user B sees "* B * C Let's leave together after dinner?," user B does not enter the private mode and can operate the private content, for example, user B clicks at the content to enter the private mode.

In the other embodiments of the present disclosure, the above-mentioned private mode may not be used. Each private content sent by a user requires a specified input.

In accordance with the embodiments of the present disclosure, the method can further include when receiving private content sent by a member of a current chat group, responding to a detection of an input indicating a private response to prompt to select members, who can see a previous private content, as target members of the present private content, or re-select members as the target members of the present private content.

For example, when user B sees "*B *C Let's leave together after dinner?" and user B typed "*" at an input area, the system can prompt whether to select member A and member C as target members, or user B is allowed to re-select the target members.

In accordance with the embodiments of the present disclosure, the method further includes creating a temporary conversation including a sender and target members. Sending a to-be-sent private content to the target members includes sending the to-be-sent private content and displaying the private content at an interface of the temporary conversation.

For example, after user A enters "*B *C Let's leave together after dinner?", a temporary conversation can be created including user A, B, and C, which is equivalent to create a temporary group. User A, B, and C can chat in the group, and the system deletes the temporary group automatically when the system determines an end of the chat. For example, when no one sends a new content after a previous chat within a predetermined time, the temporary group is deleted automatically. In another way, through a machine learning method, the conversation can be determined to an end by semantics, such that the temporary conversation is deleted. The method reduces a load of creating the temporary group, and the useless temporary group will not be left.

The method can facilitate private communications for determined target members in a chat group, prevent users from frequently creating useless chat groups, and provide more user-friendly experience.

Figure 3:
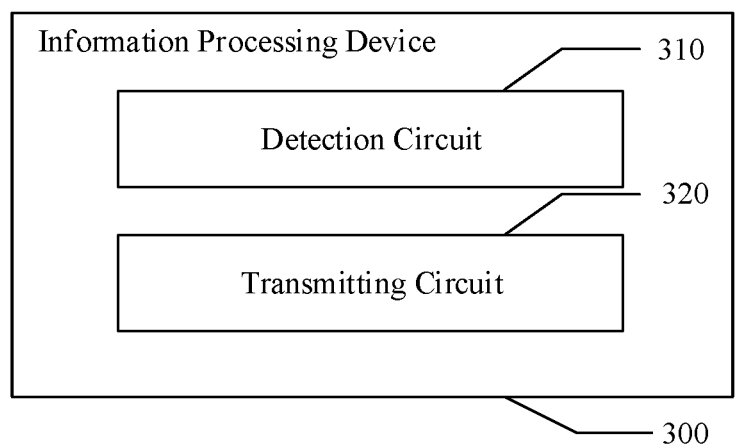
FIG. 3 illustrates a block diagram of an information processing device according to the embodiments of the present disclosure.

FIG. 3 illustrates a block diagram of the information processing device 300 according to the embodiments of the present disclosure.

As shown in FIG. 3, the information processing device 300 includes a detection circuit 310 and a transmitting circuit 320. The device 300 executes the method described above with reference to FIG. 2.

The detection circuit 310, for example, executes the operation S210 described in FIG. 2 to respond to a detection of a specified input directed to one or more members of a current chat group to determine the one or more members directed to by the specified input as target members.

The transmitting circuit 320, for example, executes the operation S220 described in FIG. 2 to respond to a reception of a sent instruction to send private content to the target members, where the private content cannot be visible by other members of the current chat group.

In accordance with the embodiments of the present disclosure, the transmitting circuit 320 is configured to respond to the reception of the sent instruction to send the to-be-sent private content and cause the private content to be displayed at the interface of the current chat group. The private content can be visible by the target members and cannot be visible by the other members of the current chat group.

In accordance with the embodiments of the present disclosure, the device further includes a first controller, which is configured to cause a sender of the private content and the target members to enter a private mode. In the private mode, a content sent to the current chat group can only be visible by the sender of the private content and the target members until the sender and the target members exit the private mode.

In accordance with the embodiments of the present disclosure, the device further includes a selection circuit, which is configured to, when receiving the private content sent by the member of the current chat group, respond to a detection of an input indicating a private response to prompt to select members, who can see a previous private content, as target members of the present private content, or re-select members as the target members of the present private content.

In accordance with the embodiments of the present disclosure, the device further includes a second controller, which is configured to, when receiving the private content sent by the member of the current chat group, respond to a detection of an operation to the private content to control to enter the private mode. In the private mode, the content sent to the current chat group can only be visible by the members, who can see the private content until the members exit the private mode.

In accordance with the embodiments of the present disclosure, the device can further include a creation circuit, which is configured to create a temporary conversation including the sender and the target members. The sending of the to-be-sent private content to the target members includes sending the to-be-sent private content and displaying the private content at an interface of the temporary conversation.

In accordance with the embodiments of the present disclosure, display effects of the private content are different from the other contents of the chat group.

In accordance with the embodiments of the present disclosure, any plurality of modules, sub-modules, units, or sub-units or at least a part of functions of any plurality of thereof may be realized in one module. In accordance with the embodiments of the present disclosure, any one or the plurality of modules, sub-modules, units, and sub-units can be implemented by being divided into a plurality of modules. In accordance with the embodiments of the present disclosure, any one or the plurality of modules, sub-modules, units, and sub-units can at least partially be implemented by a hardware circuit, for example a field programmable gate array (FPGA), a programmable logic array (PLA), a system on chip, a system on substrate, a system on package, and an application specific integrated circuit (ASIC), can be implemented by hardware or firmware in any other appropriate way of integrating or packaging the circuits, or can be implemented by appropriate combinations of any one or any of three implementations of software, hardware, and firmware. In some embodiments, one or more of the modules, the sub-modules, the units, and the sub-units can at least partially be implemented by a computer program. When the computer program is executed, corresponding functions can be performed.

For example, any plurality of the detection circuit 310, the transmitting circuit 320, the first controller, the selection circuit, the second controller, and the creation circuit can be combined into one module to be implemented, or any one of the modules can be divided into a plurality of modules. In some embodiments, at least part of functions of the one or more of the modules can be combined with at least part of functions of other modules to be implemented in one module. In accordance with the embodiment of the present disclosure, at least one of the detection circuit 310, the transmitting circuit 320, the first controller, the selection circuit, the second controller, or the creation circuit can at least partially be implemented by a hardware circuit, for example, a field programmable gate array (FPGA), a programmable logic array (PLA), a system on chip, a system on substrate, a system on package, and an application specific integrated circuit (ASIC), can be implemented by hardware or firmware in any other appropriate way of integrating or packaging the circuits, or can be implemented by appropriate combinations of any one or any several of three implementations of software, hardware, and firmware. In some embodiments, at least one of the detection circuit 310, the transmitting circuit 320, the first controller, the selection circuit, the second controller, or the creation circuit can at least partially be implemented by a computer program. When the computer program is executed, corresponding functions can be performed.

Figure 4:
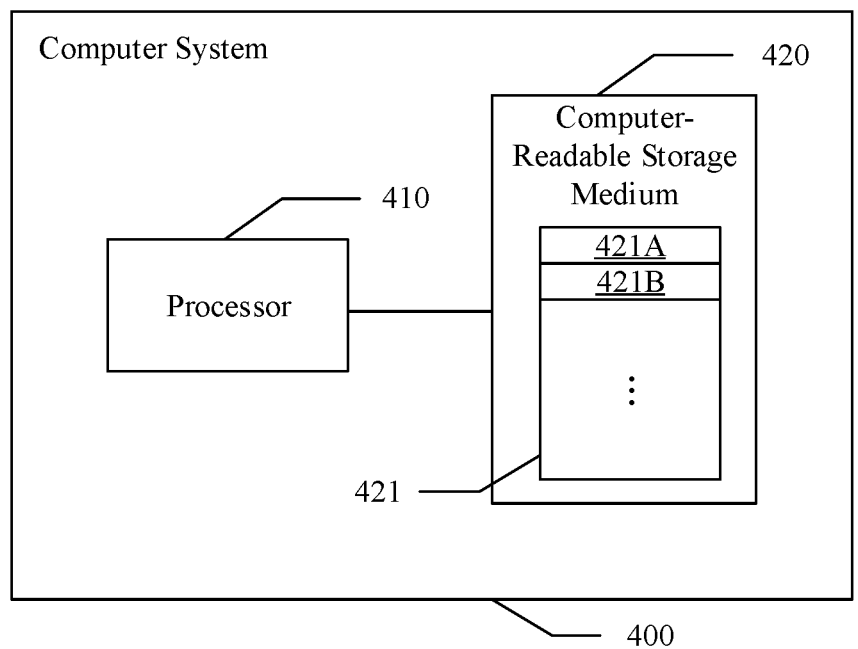
FIG. 4 illustrates a block diagram of a computer system according to the embodiments of the present disclosure.

FIG. 4 illustrates a block diagram of a computer system for implementing the method described above according to the embodiments of the present disclosure. The computer system shown in FIG. 4 is merely an example and should not limit the functions and application scopes of the embodiments of the present disclosure.

As shown in FIG. 4, a computer system 400 includes a processor 410 and a computer readable storage medium 420. The computer system 400 executes the method in accordance with the embodiments of the present disclosure.

In some embodiments, the processor 410, for example, can include a general-purpose microprocessor, an instruction set processor, a related chipset, a special purpose microprocessor (for example, application specific integrated circuit (ASIC)), etc. The processor 410 can further include on-board memory for cache use. The processor 410 may be a single processor or multiple processors for executing different actions of a method flow in accordance with the embodiments of the present disclosure.

The computer readable storage medium 420, for example, can be a non-volatile computer readable storage medium, and the specific examples include but not limited to a magnetic storage device such as a magnetic tape or a hard disk (HDD), an optical storage device such as an optical disk (CD-ROM), memory such as random access memory (RAM) or flash memory, etc.

The computer readable storage medium 420 can include a computer program 421. The computer program 421 can include computer code/computer executable instructions, which causes the processor 410 to execute the method or any variations of the method when the computer program 421 is executed by the processor 410.

The computer program 421 can be configured as computer program code having one or more computer program modules. For example, in some embodiments, the code of the computer programs 421 can include one or more program modules, for example 421A, 421B, etc. A division method and number of modules are not fixed. Those skilled in the art can use appropriate program modules or program module combinations according to actual situations. When these program module combinations are executed by the processor 410, the processor 410 can execute the method or any variations of the method in accordance with the embodiments of the present disclosure.

In accordance with the embodiments of the present disclosure, at least one of the detection circuit 310, the transmitting circuit 320, the first controller, the selection circuit, the second controller, or the creation circuit is implemented as a computer program module with reference to FIG. 4, which implements the corresponding operations described above when the computer program module is executed by the processor 410.

The present disclosure provides a computer readable storage medium. The computer readable medium can be included by equipment, a device, and a system described in the above embodiments or be an individual presence and not assembled at the equipment, the device, and the system. The computer readable storage medium carries one or more programs, which implement the method according to the embodiments of the present disclosure when the one or more computer programs are executed.

In accordance with the embodiment of the present disclosure, the computer readable storage medium can be a non-volatile computer readable storage medium, for example, including but not limited to a portable computer disk, a hard disk, random access memory (RAM), read-only memory (ROM), erasable programmable read-only memory (EPROM or flash memory), portable compact disk read-only memory (CD-ROM), an optical storage device, a magnetic storage device, or any appropriate combinations of the above-mentioned computer readable storage media. In the present disclosure, the computer readable storage medium can be any physical medium containing or storing programs, which can be used by an instruction execution system, device, or apparatus or used in conjunction with the instruction execution system, device, or apparatus.

In accordance with the various embodiments of the present disclosure, the flowcharts and block diagrams of the drawings illustrate an architecture, a functionality, and an operation of possible implementations of the system, the method and the computer program products. In some embodiments, each block of the flowchart or block diagram may represent a module, a program segment, or a part of computer code, which contains one or more of executable instructions to implement the determined logic functions. In some embodiments, for some replacement implementations, the functions marked in the blocks may also occur in a different order other than the order marked in the drawings. For example, two blocks, which are represented with a connection, may actually be executed substantially in parallel and may sometimes be executed in a reverse order, which depends on the involved functions. In some embodiments, each block and the combinations of the blocks of the block diagrams and the flowcharts can be implemented with a dedicated hardware-based system that executes the specified function or operation, or can be implemented with a combination of dedicated hardware and the computer instructions.

Those of skill in the art should understand that the features described in each of the embodiments and/or claims of the present disclosure can be combined and/or integrated in various ways, even such combinations or integrations are not described in the present disclosure. Without departing from the spirit and teaching of the present disclosure, the features described in each of the embodiments and/or claims of the present disclosure can be combined and/or integrated in various ways. All these combinations and/or integrations fall within the scope of the present disclosure.

In accordance with the specific embodiments of the present disclosure, although the present disclosure has been shown and described, but those skilled in the art should understand that without departing from the spirit and scope of the present disclosure as defined by the appended claims and their equivalents, various changes in form and detail may be made to the present disclosure. Therefore, the scope of the present disclosure should not be limited to the embodiments described above but should be determined not only by the appended claims, but also by the equivalents of the appended claims.

What is claimed is:

1. An information processing method, comprising:
    detecting a first specified input on a sender terminal device directed to one or more members of a current chat group;
    controlling the sender terminal device to enter a private mode in response to detecting the first specified input;
    determining the one or more members directed to by the first specified input as one or more target members;
    sending, by the sender terminal device, first private content along with the first specified input to one or more target terminal devices of the one or more target members, the first private content being not visible to other members of the current chat group on non-target terminal devices of the other members;
    sending, by the sender terminal device in the private mode, second private content without the first specified input to the one or more target terminal devices, the second private content being not visible to the other members of the current group chat on the non-target terminal devices;
    detecting a second specified input on the sender terminal device, the second specified input being different from the first specified input; and
    controlling the sender terminal device to exit the private mode in response to the second specified input.

2. The method of claim 1, further comprising:
    displaying the first private content and the second private content at a group chat interface of the current chat group.

3. The method of claim 2, further comprising:
    receiving third private content from one of the one or more target terminal devices;
    selecting one or more members from the one or more target members or re-selecting one or more members from the current chat group; and
    sending a response to prompt to the one or more selected members.

4. The method of claim 2, further comprising:
    receiving, by a receiver terminal device, the first private content with the first specified input sent by the sender terminal device, the receiver terminal device being one of the one or more target terminal devices;
    controlling the receiver terminal device to enter the private mode, in which a content sent by the receiver terminal device without the first specified input to the current chat group is visible on the sender terminal device and the one or more target terminal devices but not on the non-target terminal devices;
    detecting, by the receiver terminal device, the second specified input; and
    controlling the receiver terminal device to exit the private mode in response to the second specified input.

5. The method of claim 4, wherein controlling the receiver terminal device to enter the private mode includes controlling the receiver terminal device to enter the private mode in response to detecting an operation at the received first private content.

6. The method of claim 1, further comprising:
    creating a temporary conversation including a sender using the sender terminal device and the one or more target members;
    displaying the first private content and the second private content at an interface of the temporary conversation; and
    deleting the interface of the temporary conversation in response to at least one of:
        no new content having been received in the temporary conversation for a predetermined time; or
        semantics of one or more contents in the temporary conversation indicating that the temporary conversation has ended.

7. The method of claim 1, wherein a display of the first private content and the second private content is different from a display of other content of the chat group.

8. An electronic apparatus for information processing, comprising:
    a memory storing a computer program; and a processor configured to execute the computer program to:
  detect a first specified input by a sender, directed to one or more members of a current chat group;
  control to enter a private mode in response to detecting the first specified input;
  determine the one or more members directed to by the first specified input as one or more target members;
  send first private content along with the first specified input to the one or more target members, the first private content being not visible to other members of the current chat group;
  send second private content without the first specified input to the one or more target members, the second private content being not visible to the other members of the current group chat;
  detect a second specified input by the sender, the second specified input being different from the first specified input; and
  control to exit the private mode in response to the second specified input.

9. The electronic apparatus for information processing of claim 8, wherein the processer is further configured to execute the computer program to display the first private content and the second private content at a group chat interface of the current chat group.

10. The electronic apparatus for information processing of claim 8, wherein the processer is configured to execute the computer program to:
  create a temporary conversation including the sender and the one or more target members;
  display the first private content and the second private content at an interface of the temporary conversation; and
  delete the interface of the temporary conversation in response to at least one of:
    no new content having been received in the temporary conversation for a predetermined time; or
    semantics of one or more contents in the temporary conversation indicating that the temporary conversation has ended.

11. A non-transitory computer-readable storage medium storing a computer program, when executed by one or more processors, the computer program causes the processors to perform a method of information processing, the method comprising:
  detecting a first specified input on a sender terminal device directed to one or more members of a current chat group;
  controlling the sender terminal device to enter a private mode in response to detecting the first specified input;
  determining the one or more members directed to by the first specified input as one or more target members;
  sending, from the sender terminal device, first private content along with the first specified input to one or more target terminal devices of the one or more target members, the first private content being not visible to other members of the current chat group on non-target terminal devices of the other member;
  sending, by the sender terminal device in the private mode, second private content without the first specified input to the one or more target terminal devices, the second private content being not visible to the other members of the current group chat on the non-target terminal devices;
  detecting a second specified input on the sender terminal device, the second specified input being different from the first specified input; and
  controlling the sender terminal device to exit the private mode in response to the second specified input being sent by the sender terminal device.

12. The non-transitory computer-readable storage medium of claim 11, the method further comprising:
  displaying the first private content and the second private content at a group chat interface of the current chat group.

13. The non-transitory computer-readable storage medium of claim 12, the method further comprising:
  receiving third private content from one of the one or more target terminal devices;
  selecting one or more members from the one or more target members or re-selecting one or more members from the current chat group; and
  sending a response to prompt to the one or more selected members.

14. The non-transitory computer-readable storage medium of claim 11, the method further comprising:
  creating a temporary conversation including a sender using the sender terminal device and the one or more target members;
  displaying the first private content and the second private content at an interface of the temporary conversation; and
  deleting the interface of the temporary conversation in response to at least one of:
    no new content having been received in the temporary conversation for a predetermined time; or
    semantics of one or more contents in the temporary conversation indicating that the temporary conversation has ended.

15. The non-transitory computer-readable storage medium of claim 11, wherein a display of the first private content and the second private content is different from a display of other content of the chat group.

* * * * *